(12) United States Patent
Yoshida

(10) Patent No.: US 6,662,545 B1
(45) Date of Patent: Dec. 16, 2003

(54) CHAIN COVER

(75) Inventor: Eiji Yoshida, Yao (JP)

(73) Assignee: Masakazu Yamamoto, Osaka (JP)

( * ) Notice: Subject to any disclaimer, the term of this patent is extended or adjusted under 35 U.S.C. 154(b) by 0 days.

(21) Appl. No.: 10/287,705

(22) Filed: Nov. 5, 2002

(51) Int. Cl.[7] .............................................. F16G 13/06
(52) U.S. Cl. ................... 59/78; 198/189; 59/93
(58) Field of Search .......................... 59/78.1, 78, 93; 248/49, 51; 198/189

(56) References Cited

U.S. PATENT DOCUMENTS

| | | | | |
|---|---|---|---|---|
| 2,954,113 A | * | 9/1960 | Hibbard et al. | 198/189 |
| 3,669,247 A | * | 6/1972 | Pulver | 198/189 |
| 3,910,406 A | * | 10/1975 | Pulver et al. | 198/189 |
| 5,042,244 A | * | 8/1991 | Worsley | 59/78 |

FOREIGN PATENT DOCUMENTS

| | | |
|---|---|---|
| JP | 08-121542 | 5/1996 |
| JP | 08-231017 | 9/1996 |

* cited by examiner

*Primary Examiner*—David B. Jones
(74) *Attorney, Agent, or Firm*—Wenderoth, Lind & Ponack, L.L.P.

(57) ABSTRACT

A chain cover is provided which can be mounted on a general-purpose roller chain, can be attached and detached to and from the chain, and will not impair bendability of the chain. Side covers for covering both sides of the chain extend from both ends of a top cover for covering a top of the chain. Each side cover has a shaft hole for receiving a coupling pin of the chain, a convex arcuate front edge that is concentric with the shaft hole, a concave arcuate rear edge opposed to the front edge, and a tapered guide surface. The top cover is supported directly by roller links of the chain to allow the coupling pin to be inserted not deeply into the shaft hole.

18 Claims, 4 Drawing Sheets

CHAIN COVER

BACKGROUND OF THE INVENTION

This invention relates to a chain cover which is mounted on a roller chain to cover a top and both sides of the chain, and provides a flat transporting surface.

Such chain covers are shown in JP patent publications 8-121542 and 8-231017.

The chain cover of the former publication has a top cover (web cover) covering a top of a chain, and side covers (opposed side walls) provided on both sides of the top cover to cover sides of the chain. The chain cover is mounted on the chain by fitting coupling pins of the chain into two shaft holes formed in each side cover. A load of articles being transported by the chain, that is applied to the top cover, is borne by the coupling pins.

The chain cover of the latter publication has a top cover having a length corresponding to one pitch of a chain. From both sides of the top cover, side covers extend which have a convex arcuate front edge and a concave arcuate rear edge that are concentrical with coupling pins of the chain. In an inner surface of each side cover, a groove is formed for engaging a pin-link plate with coupling pins. Two kinds of such cover blocks having different shapes of the grooves are alternately arranged and mounted on the chain.

With the chain cover of JP patent publication 8-121542, since a load applied to the top cover is borne by the coupling pins, it is necessary to increase an amount of insertion of the coupling pins into the shaft holes to bear the load stably. Thus, a roller chain on which the chain cover is to be fitted is also a special article. Further, it is difficult to attach and detach the chain cover on and from the roller chain.

In contrast, the chain cover of JP patent publication 8-231017 has a shape corresponding to one pitch of the chain. Thus, the above problem is substantially solved. But, since such covers are used with two different kinds of cover blocks combined, they are disadvantageous in terms of cost. It is also troublesome to maintain and attach and detach the cover blocks. Also, since it is necessary to attach and detach the cover blocks by markedly bending roller links and pin links of the chain, it is impossible to replace any damaged cover without dismounting the chain, from sprocket wheels.

Further, the chain cover of this publication cannot completely eliminate a bending restriction of the chain. Thus, a turning radius of the chain with the cover mounted thereon is larger than that when the cover is not on the chain.

An object of this invention is to provide a chain cover which solves these problems.

SUMMARY OF THE INVENTION

According to this invention, there is provided a chain cover comprising a top cover having a length substantially equal to a pitch of a roller chain for covering a top of the chain, and side covers extending from both ends of the top cover for covering sides of the roller chain. Each side cover has a shaft hole for receiving a coupling pin of the chain, a convex arcuate front edge that is concentric with the shaft hole, a concave arcuate rear edge opposed to the front edge, and a tapered guide surface tapering from an inner surface of the side cover below the shaft hole. The top cover is supported by roller links of the chain when the chain cover is mounted on the roller chain.

Preferably, a bottom surface of the side cover is a straight surface parallel to the top cover, and a distance from a center of the shaft hole to the bottom surface of the side cover, and a rearward extending amount of the bottom surface from the center of the shaft hole, are both substantially equal to about half a chain pitch.

Preferably, a protrusion is formed on an inner surface of the side cover, and a dimension between protrusions on two side covers is substantially equal to a distance between outer surfaces of pin links of the chain.

The chain cover of this invention has its top cover supported by roller links of the chain to directly bear a load of transported articles on the roller links. Thus, it is unnecessary to increase an amount of insertion of coupling pins of the chain into the shaft holes. An amount of insertion sufficient to obtain an engaging force, required to prevent the chain cover from coming off the chain, is sufficient. The chain cover of this invention can be used, without any problems, with or a general-purpose (standard) roller chain in which a protruding amount of coupling pins is small.

Since an amount of insertion of the coupling pins into the shaft holes can be small, the chain cover can be easily attached and detached to and from the chain.

Further, since a coupling pin is engaged in the shaft holes, only one kind of chain cover is necessary. The chain cover can be attached and detached without severe restriction.

With the chain cover, in which the distance from the center of the shaft holes to the bottom surfaces, and the rearward extending amount of the bottom surfaces from the center of the shaft holes, are about half the chain pitch, bending restriction of the chain by such chain covers is relaxed. Thus, it is possible to bend any portion of the chain at an angle of 90 degrees even after the chain covers have been fit to the chain.

In the an arrangement in which a protrusion of a small area is formed on an inner surface of each side cover, a contact area of the inner surface of each side cover with the chain decreases, so that an increase in bending resistance due to friction with the chain cover can be suppressed.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

FIGS. 1A–3 show an embodiment of a chain cover of this invention.

The illustrated chain cover 1 is molded from a synthetic resin, but it may be formed from a metal.

The chain cover 1 has a flat plate-shaped top cover 2 and a pair of side covers 3 integrally provided to extend from both ends of the top cover 2. The top cover covers a top of a chain and the side covers 3 cover both sides of the chain.

Figure 2:
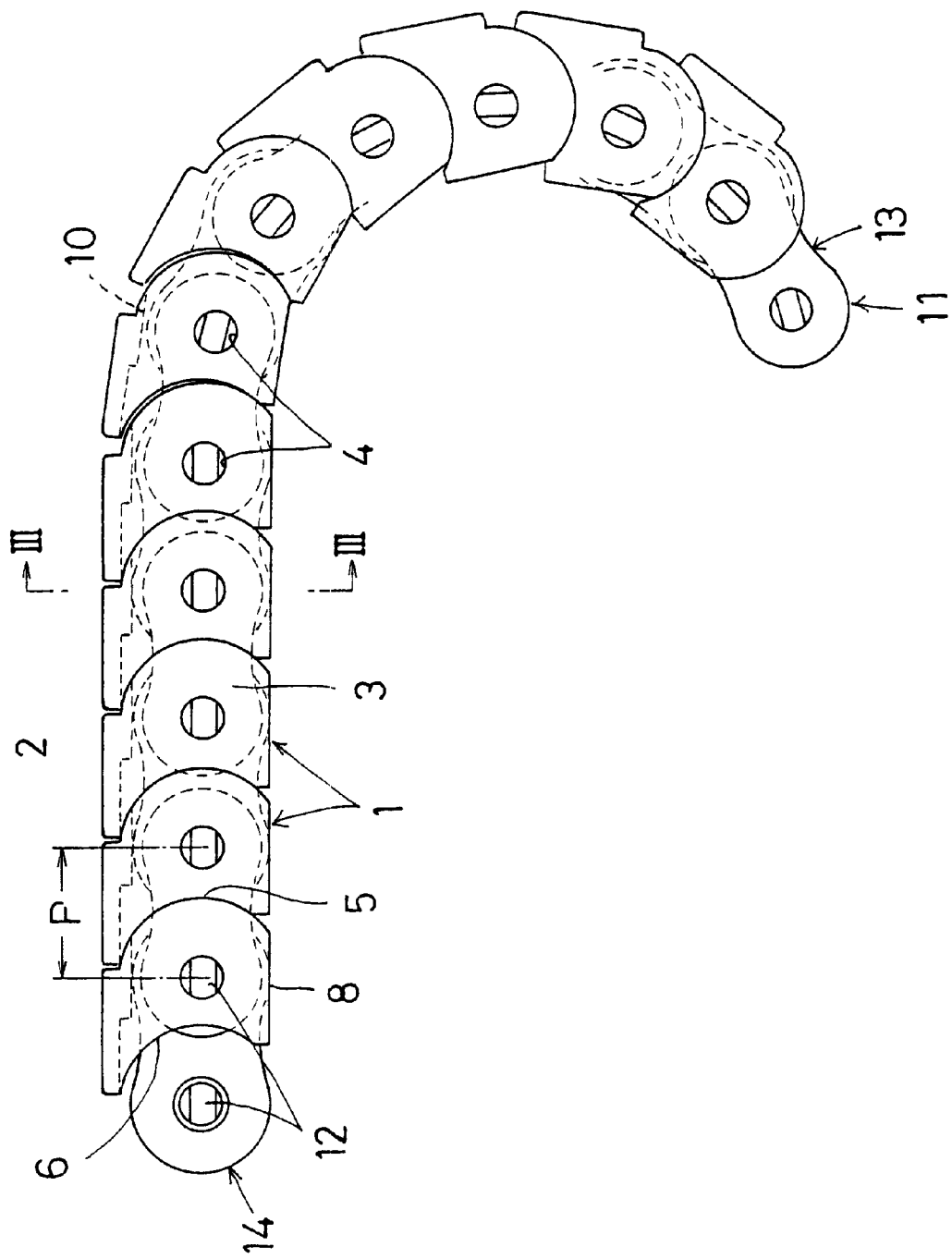
FIG. 2 is a side view of the chain cover mounted on a roller chain.

The top cover 2 has a length L that is substantially equal to a chain pitch P (see FIG. 2).

The side covers 3 each have a shaft hole 4 for receiving a coupling pin 12 of a roller chain 11, a convex arcuate front edge 5 that is concentric with the shaft hole 4, a concave arcuate rear edge 6 opposed to the front edge 5, and an outwardly tapered guide surface 7 tapering on an inner surface of each side cover 3 below the shaft hole 4. The shaft hole 4 is a through hole in view of ease of manufacture of the cover, but it may be a non-through hole.

For convenience of description, the convex arcuate front edge 5 is called a front edge, and the concave arcuate rear edge 6 is called a rear edge. However, these edges may be either front or rear.

Figure 3:
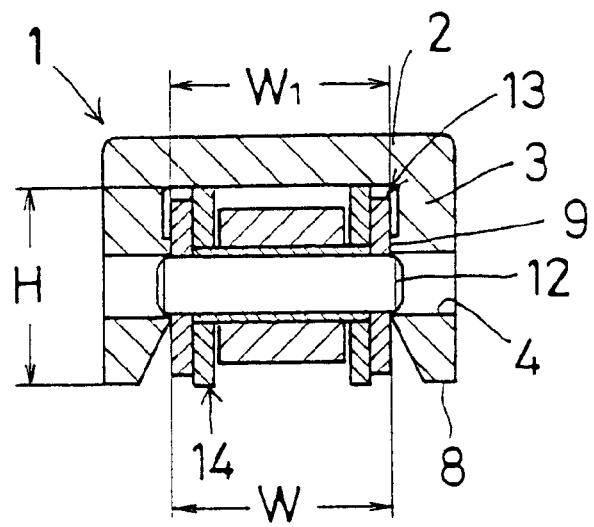
FIG. 3 is a sectional view along line III—III of FIG. 2.

As shown in FIG. 3, height H of the side covers 3 is substantially equal to a height of the roller chain 11. Bottom surfaces 8 of the side covers 3 are straight surfaces parallel to the top cover 2. Distance h (FIG. 1C) from a center of the shaft holes 4 to the bottom surfaces 8 is about half the chain pitch P (FIG. 2). Further, distance 1 (FIG. 1C) from the center of the shaft hole 4 to rear edge 6 is also set to about half the chain pitch P by chamfering an acute corner portion formed at an intersection of the rear edge 6 and bottom surface 8. It is preferable to set the distance 1 to be larger than ½P, and a value (l+h) to be slightly larger than P, because this makes it possible to prevent the chain cover 1 from coming off the chain due to engagement between plural chain covers.

Additionally, a protrusion 9 of a small area is formed on an inner surface of each side cover 3 so as to surround the shaft hole 4, and distance W (FIG. 3) between the protrusions 9 on the right and left side covers 3 is substantially equal to the distance W1 between the pin links 13 of the chain 11. The protrusions 9 should protrude slightly (e.g. at most 0.5 mm) from the inner surfaces of the side covers 3.

Figure 1A:
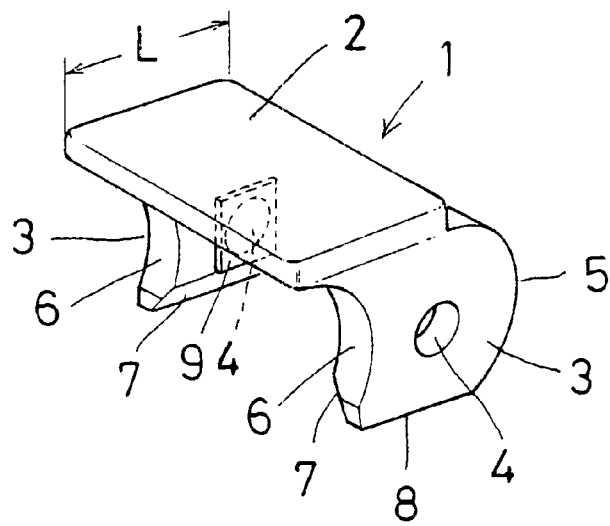
FIG. 1A is a perspective view showing an embodiment of a chain cover of this invention.
Figure 1B:
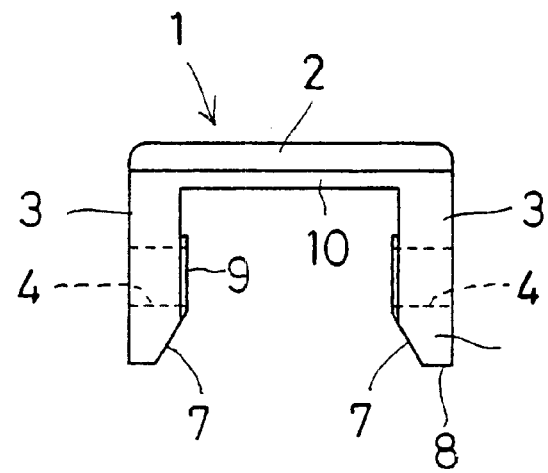
FIG. 1B is a front view of the chain cover.
Figure 1C:
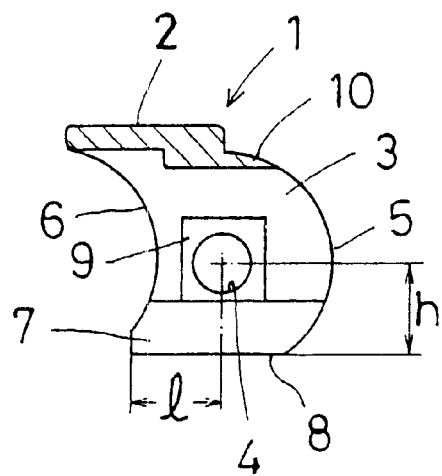
FIG. 1C is a vertical sectional view of the chain cover.

As shown in FIG. 1C, an auxiliary covering portion 10 is provided so as to extend forwardly from the top cover 2. This portion 10 is preferable and serves to close a space formed between chain covers at a point where the chain turns.

Chain covers 1 having such a structure are fitted on roller chain 11 so that each cover 1 will engage one coupling pin 12 with all of the covers having the same shape and arranged in the same direction. This is performed by straddling the chain cover 1 on the roller chain 11 and pushing it downwardly or obliquely downwardly. When the cover 1 is pushed downwardly, an outward component force is produced at a contact point between the tapered guide surface 7 and the coupling pin 12. This force pushes apart the side covers 3.

When the coupling pin 12 fits into the shaft holes 4, the side covers 3 will return to their original position by their own resilience, so that engagement with the coupling pin 12 is maintained. Thus, fitting is extremely easy. Also, since with a general-purpose roller chain, a protruding amount of the coupling pin 12 from a link plate is small, it is not necessary to push apart the side covers 3 much, so that they can be in forced apart with a small force.

FIG. 2 shows a side face of the chain after the covers 1 have been fitted thereto. In this state, as shown in FIG. 3, the top cover 2 is in contact with roller links 14 of the chain, so that a load of an article being transported applied to the top cover 2 is borne by the roller links 14. Also, the side covers 3 are in contact with the chain 11 only at protrusions 9.

Figure 4:
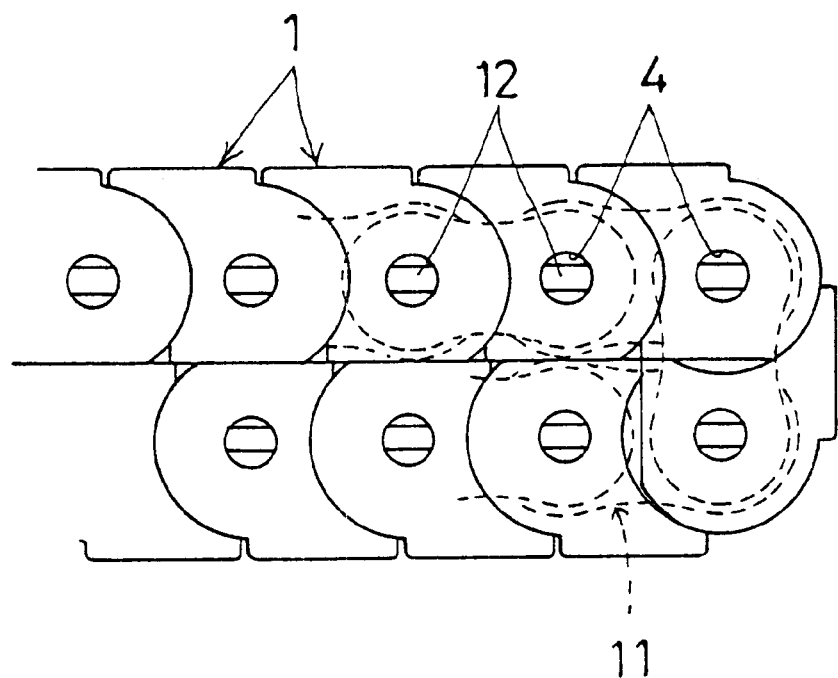
FIG. 4 is a side view showing how the chain is folded over after chain covers of the invention have been mounted.

As shown in FIG. 4, by shaping the chain cover 1 as shown in FIG. 1, and setting dimensions h and l in FIG. 1C to be about half chain pitch P, the chain can bend by 90 degrees at its hinges even after the covers have been fitted to the chain. Thus, even after the covers have been fitted to the chain, a minimum turning radius of the chain will not increase.

Figure 5:
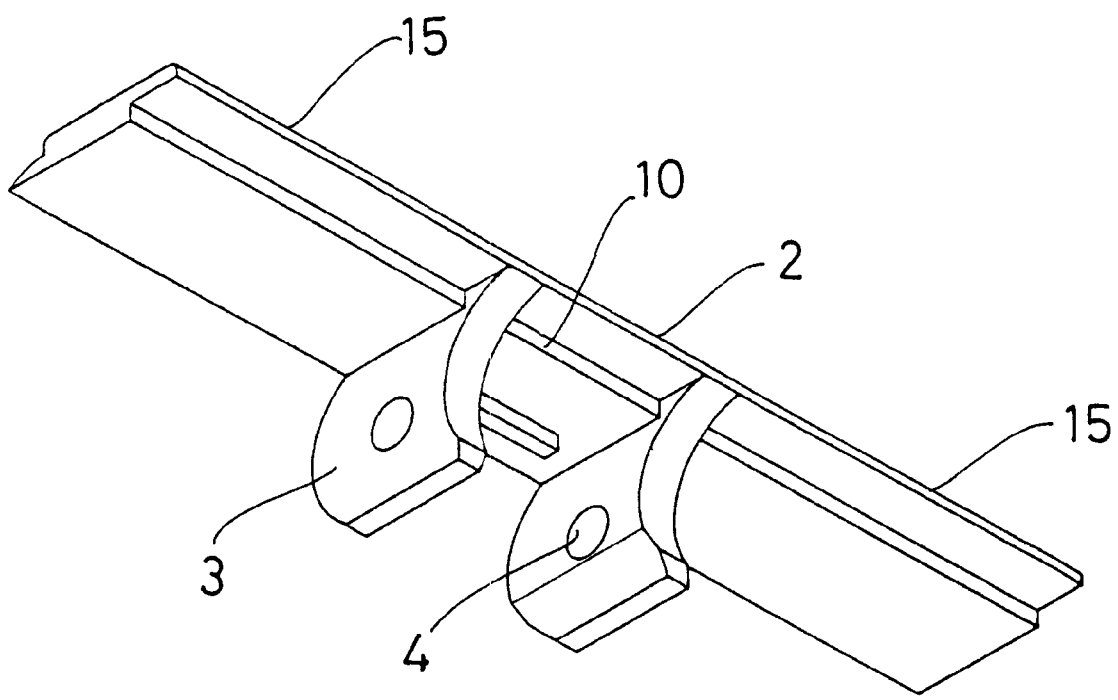
FIG. 5 is a perspective view from a bottom of a chain cover of another embodiment.

As shown in FIG. 5, the chain cover 1 may have a top cover 2 which extends to both sides to provide extensions 15. This embodiment has a greater load supporting capacity due to an increased supporting area by the provision of extensions 15.

As described above, with the chain cover according to this invention, since the top cover 2 is directly supported by the roller links 14, it is unnecessary to deeply insert the coupling pin 12 of the chain into the shaft holes 4. Thus, the chain cover can be fitted on onto an inexpensive general-purpose roller chain. Also, attaching and detaching of the chain cover are easy. And, it is not necessary to provide two kinds of chain covers. This is advantageous in terms of cost.

Further, since the chain cover can be attached and detached without bending a chain much, it is possible to replace any damaged chain cover at a turning portion of the chain without dismounting the chain from sprocket wheels.

Besides Additionally, with an arrangement of this embodiment, since the minimum turning radius of the chain does not increase even after the chain covers have been fitted, it is possible to avoid increase in a size of the a conveyor.

Further, since friction between the chain and the side covers decreases because the protrusions on the inner surfaces of the side covers are in contact with the pin links, bendability of the chain is not impaired, and increase in power loss due to fitting of the chain covers to the chain is prevented.

What is claimed is:

1. A chain cover comprising:
    a top cover to cover a top portion of a roller chain, said top cover having a length that is substantially equal to a pitch of the roller chain and being constructed and arranged to be supported by roller links of the roller chain when the chain cover is mounted on the roller chain; and
    side covers for covering side portions of the roller chain, each of said side covers extending from a respective end of said top cover and having
       (i) a hole for receiving a coupling pin of the roller chain, said hole having a first end and a second end,
       (ii) a convex arcuate front edge that is concentric with said hole,
       (iii) a concave arcuate rear edge, and
       (iv) a guide portion beneath said hole, said guide portion having
          (a) an inner surface and an outer surface, with said inner surface being angled in a direction from said first end of said hole toward said outer surface,
          (b) a front end and a rear end, and
          (c) a bottom surface.

2. The chain cover according to claim 1, wherein said bottom surface is planar and parallel to said top cover, with a first distance from a center of said hole to said bottom surface, and a second distance from said rear end to a line extending through the center of said hole, each being substantially equal to about one half the pitch of the roller chain, said first distance and said second distance being orthogonal to each other.

3. The chain cover according to claim 2, wherein said each of said side covers includes a protrusion surrounding a respective said hole, with said protrusion of one of said each of said side covers facing said protrusion of another of said each of said side covers and being spaced therefrom by a distance that is substantially equal to a distance between outer surfaces of pin links of the roller chain.

4. The chain cover according to claim 2, wherein,
said top cover includes a first extension extending beyond one of said each of said side covers, and a second extension extending beyond another of said each of said side covers.

5. The chain cover according to claim 1, wherein
said each of said side covers includes a protrusion surrounding a respective said hole, with said protrusion of one of said each of said side covers facing said protrusion of another of said each of said side covers and being spaced therefrom by a distance that is substantially equal to a distance between outer surfaces of pin links of the roller chain.

6. The chain cover according to claim 1, wherein,
said top cover includes a first extension extending beyond one of said each of said side covers, and a second extension extending beyond another of said each of said side covers.

7. A combination of a chain cover and a roller chain, said roller chain having roller links and a coupling pin, said chain cover comprising:
a top cover covering a top portion of said roller chain, said top cover having a length that is substantially equal to a pitch of said roller chain and being supported by said roller links; and
side covers covering side portions of said roller chain, each of said side covers extending from a respective end of said top cover and having
(i) a hole receiving said coupling pin, said hole having a first end and a second end,
(ii) a convex arcuate front edge that is concentric with said hole,
(iii) a concave arcuate rear edge, and
(iv) a guide portion beneath said hole, said guide portion having
(a) an inner surface and an outer surface, with said inner surface being angled in a direction from said first end of said hole toward said outer surface,
(b) a front end and a rear end, and
(c) a bottom surface.

8. The combination according to claim 7, wherein
said bottom surface is planar and parallel to said top cover, with a first distance from a center of said hole to said bottom surface, and a second distance from said rear end to a line extending through the center of said hole, each being substantially equal to about one half the pitch of said roller chain, said first distance and said second distance being orthogonal to each other.

9. The combination according to claim 8, wherein
said roller chain further has pin links positioned outwardly of said roller links, respectively, and
said each of said side covers includes a protrusion surrounding a respective said hole, with said protrusion of one of said each of said side covers contacting one of said pin links, and said protrusion of another of said each of said side covers contacting another of said pin links.

10. The combination according to claim 8, wherein,
said top cover includes a first extension extending beyond one of said each of said side covers, and a second extension extending beyond another of said each of said side covers.

11. The combination according to claim 7, wherein
said roller chain further has pin links positioned outwardly of said roller links, respectively, and
said each of said side covers includes a protrusion surrounding a respective said hole, with said protrusion of one of said each of said side covers contacting one of said pin links, and said protrusion of another of said each of said side covers contacting another of said pin links.

12. The combination according to claim 7, wherein,
said top cover includes a first extension extending beyond one of said each of said side covers, and a second extension extending beyond another of said each of said side covers.

13. The combination according to claim 7, wherein said roller chain further has additional roller links and an additional coupling pin, and further comprising an additional chain cover, said additional chain cover comprising:
a top cover covering another top portion of said roller chain, said top cover having a length that is substantially equal to the pitch of said roller chain and being supported by said additional roller links; and
side covers covering other side portions of said roller chain, each of said side covers extending from a respective end of said top cover and having
(i) a hole receiving said additional coupling pin, said hole having a first end and a second end,
(ii) a convex arcuate front edge that is concentric with said hole,
(iii) a concave arcuate rear edge, and
(iv) a guide portion beneath said hole, said guide portion having
(a) an inner surface and an outer surface, with said inner surface being angled in a direction from said first end of said hole toward said outer surface,
(b) a front end and a rear end, and
(c) a bottom surface,
with said chain cover and said additional chain cover being immediately adjacent one another and substantially identical to one another.

14. The combination according to claim 13, wherein
said bottom surface of said guide portion of said each of said side covers of said additional chain cover is planar and parallel to said top cover of said additional chain cover, with a first distance from a center of said hole of said each of said side covers of said additional chain cover to said bottom surface, and a second distance from said rear end of said guide portion of said each of said side covers of said additional chain cover to a line extending through the center of said hole, each being substantially equal to about one half the pitch of said roller chain, said first distance and said second distance being orthogonal to each other.

15. The combination according to claim 14, wherein
said roller chain further has additional pin links positioned outwardly of said additional roller links, respectively, and
said each of said side covers of said additional chain cover includes a protrusion surrounding a respective said hole of said each of said side covers of said additional chain cover, with said protrusion of one of said each of said side covers contacting one of said additional pin links, and said protrusion of another of said each of said side covers contacting another of said additional pin links.

16. The combination according to claim 14, wherein,
said top cover of said additional chain cover includes a first extension extending beyond one of said each of said side covers of said additional chain cover, and a second extension extending beyond another of said each of said side covers.

17. The combination according to claim 13, wherein
said roller chain further has additional pin links positioned outwardly of said additional roller links, respectively, and
said each of said side covers of said additional chain cover includes a protrusion surrounding a respective said hole of said each of said side covers of said additional chain cover, with said protrusion of one of said each of said side covers contacting one of said additional pin links, and said protrusion of another of said each of said side covers contacting another of said additional pin links.

18. The combination according to claim 13, wherein,
said top cover of said additional chain cover includes a first extension extending beyond one of said each of said side covers of said additional chain cover, and a second extension extending beyond another of said each of said side covers.

* * * * *